(12) United States Patent
Lin

(10) Patent No.: US 6,393,027 B1
(45) Date of Patent: *May 21, 2002

(54) QUASI-PUSHOUT PACKET DISCARDING METHOD FOR PACKET COMMUNICATION SYSTEMS WITH SHARED BUFFER

(75) Inventor: Yu-Sheng Lin, Hsinchu (TW)

(73) Assignee: Accton Technology Corporation, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/116,258

(22) Filed: Jul. 16, 1998

(30) Foreign Application Priority Data

Feb. 24, 1998 (CN) .......................... 87102595 A

(51) Int. Cl.⁷ .............................................. H04L 12/28
(52) U.S. Cl. ........................................ 370/412; 370/414
(58) Field of Search ................................ 370/412, 413, 370/414, 429, 229

(56) References Cited

U.S. PATENT DOCUMENTS

| | | | |
|---|---|---|---|
| 5,521,916 A | * 5/1996 | Choudhury et al. | 370/60.1 |
| 5,724,358 A | * 3/1998 | Headrick et al. | 370/418 |
| 5,982,771 A | * 11/1999 | Caldara et al. | 370/389 |
| 6,272,143 B1 | * 8/2001 | Lin et al. | 370/412 |

* cited by examiner

Primary Examiner—Alpus H. Hsu
Assistant Examiner—Duc Ho
(74) Attorney, Agent, or Firm—Sughrue Mion, PLLC

(57) ABSTRACT

The present invention discloses a method and a system of packet communication queuing and selective pushout. In the packet communication module, the quasi-longest-queue pointer is set up to point to the quasi-longest queue within the shared buffer to implement selective pushout. When an in-coming packet enters its destination queue, or an outgoing packets leaves one of the output queues, the quasi-longest-queue pointer is maintained by comparing the length of the quasi-longest queue and that of the destination or output queue, respectively. The longer one of the current quasi-longest queue and the length-varied queue becomes the new quasi-longest queue. The present invention implements the selective pushout packet discarding discipline with significant reduction in the number of queue length comparisons and system complexity.

6 Claims, 2 Drawing Sheets

QUASI-PUSHOUT PACKET DISCARDING METHOD FOR PACKET COMMUNICATION SYSTEMS WITH SHARED BUFFER

BACKGROUND OF THE INVENTION

1. Field of The Invention

The present invention relates to packet communication systems. In particular, the invention is directed to the method and device for selective pushout in the packet communication queuing module with shared buffer.

2. Related Prior Art

In the field of packet communication networks, packet processing systems such as switches and multiplexers for ATM and Ethernet are usually implemented in the shared-buffer memory-based architecture. In such an architecture, incoming packets from all input ports to different output ports are buffered in logical output queues within the same shared buffer. As the size of the shared buffer is bounded in practical implementation, a packet processing system always needs a method to decide which packets should be discarded in buffer-full situations. This is usually referred to as the packet discarding control method. A good packet discarding control method should be fair and efficient, i.e. the shared buffer should be fairly used by all output queues, and the discarded packets should be selected to have the least impact on system performance.

Most shared buffer packet communication systems employ the threshold-based method as packet discarding control. Such approach inhibits the buffering of incoming packets when the buffer usage reaches certain threshold level. This can be easily implemented using a counter and a comparator, but it provides a less optimum performance due to space-non-conserving, i.e. packet discarding occurs before the buffer is full.

Selective pushout (hereafter referred to as "Pushout") packet discarding control was found to achieve fair buffer utilization and optimum cell loss performance for the shared-buffer switching systems. The basic concept of Pushout packet discarding is to discard a packet from the head of the longest queue to accommodate the incoming packet. This helps balancing the buffer occupancy of all queues, and also reducing the average delay by replacing an "old" packet with a "new" one. Inspite of its optimum performance, Pushout is very difficult to implement because it must sort and find out the longest one from all queues in the shared buffer on every packet arrival event. When the number of queues is large and the arrival of packets is frequent, the sorting operation may become the bottleneck for practical implementation.

Therefore, it is necessary to provide a better implementation for the Pushout packet discarding method.

SUMMARY OF THE INVENTION

The main objective of the invention is to provide a packet discarding control method for packet communication systems with shared buffer. The packet communication system has a pointer (Qmax) to point to the quasi-longest queue in the shared buffer and a corresponding queue length counter (QL[Qmax]). The pointer Qmax is updated on every packet arrival and departure events. If the destination queue of an arriving packet becomes longer than QL[Qmax] after the arrival, Qmax is updated to point to this new quasi-longest queue. Similarly, if the output queue of a departing packet is still longer than QL[Qmax] after the departure, Qmax is updated to point to this new quasi-longest queue. As the quasi-longest queue pointer Qmax is updated on every change of queue length, it tracks the real longest queue closely.

When the shared buffer is fill and there are packets arriving at the inputs of the system, the packets at the head of the quasi-longest queue are pushed out and discarded to make room for the newly arrived packets. The method is hence called quasi-pushed (QPO) packet discarding control. Since the quasi-longest queue pointer tracks the real longest queue closely, QPO is able to provide the fairness and efficiency of the original Pushout packet discarding control method. It is also suitable for practical implementation because the update of the quasi-longest queue pointer, Qmax, involves only one comparison between two queue length counters, and there is no need to sort out the maximum one among all queue length counters.

The present invention will be easily understood by referring to the following embodiment and attached drawings.

DETAILED DESCRIPTION OF PREFERRED EMBODIMENT

In a packet communication system, "packet" refers to a unit of data segment encapsulated with identification information. The size of packets in a specific system may be fixed (e.g. ATM) or variable within a range (e.g. Ethernet).

The described embodiment is a fixed-size packet switch with multi-input and multi-output ports, for example, an ATM switch. In different embodiments, the present invention can be utilized in a multi-input/single-output system, such as a multiplexer, or a single-input/multi-output system, such as a demultiplexer. The present invention can also be utilized in other embodiments with fixed or variable length packets.

Figure 1:
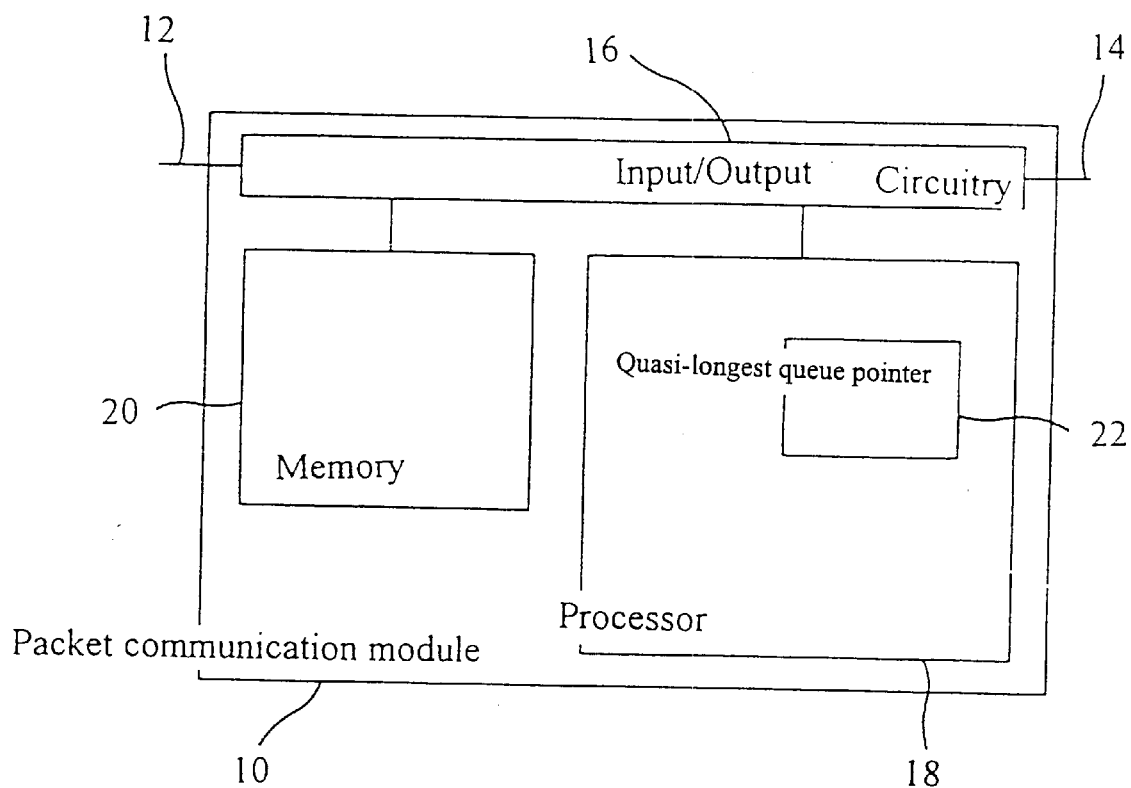
FIG. 1 depicts a packet communication module.

Referring to FIG. 1, the packet communication module 10 is connected to single or multiple input ports 12, from which the module receives packets. The packet communication module 10 is also connected to a single or multiple output ports 14 for transmitting switched packets. Input ports 12 and output ports 14 are connected to the input/output circuitry 16 which is coupled to the processor 18 and the shared buffer memory 20.

If the packet communication module 10 is an embodiment of ATM switch, the input/output circuitry 16 may consist the phase-alignment circuitry and the serial-parallel converters. For packets received in input ports 12, their encapsulated identification information is forward to and processed by the processor 18. The shared buffer memory 20 serves as storage for packet data.

The processor 18 contains the quasi-longest-queue pointer 22 which points to one of the queues in memory 20. This quasi-longest queue is possibly, but not necessarily, the longest queue in the shared buffer memory 20. In case the quasi-longest queue is not the real longest one, its queue length will still be quite close to the real longest one.

Figure 2:
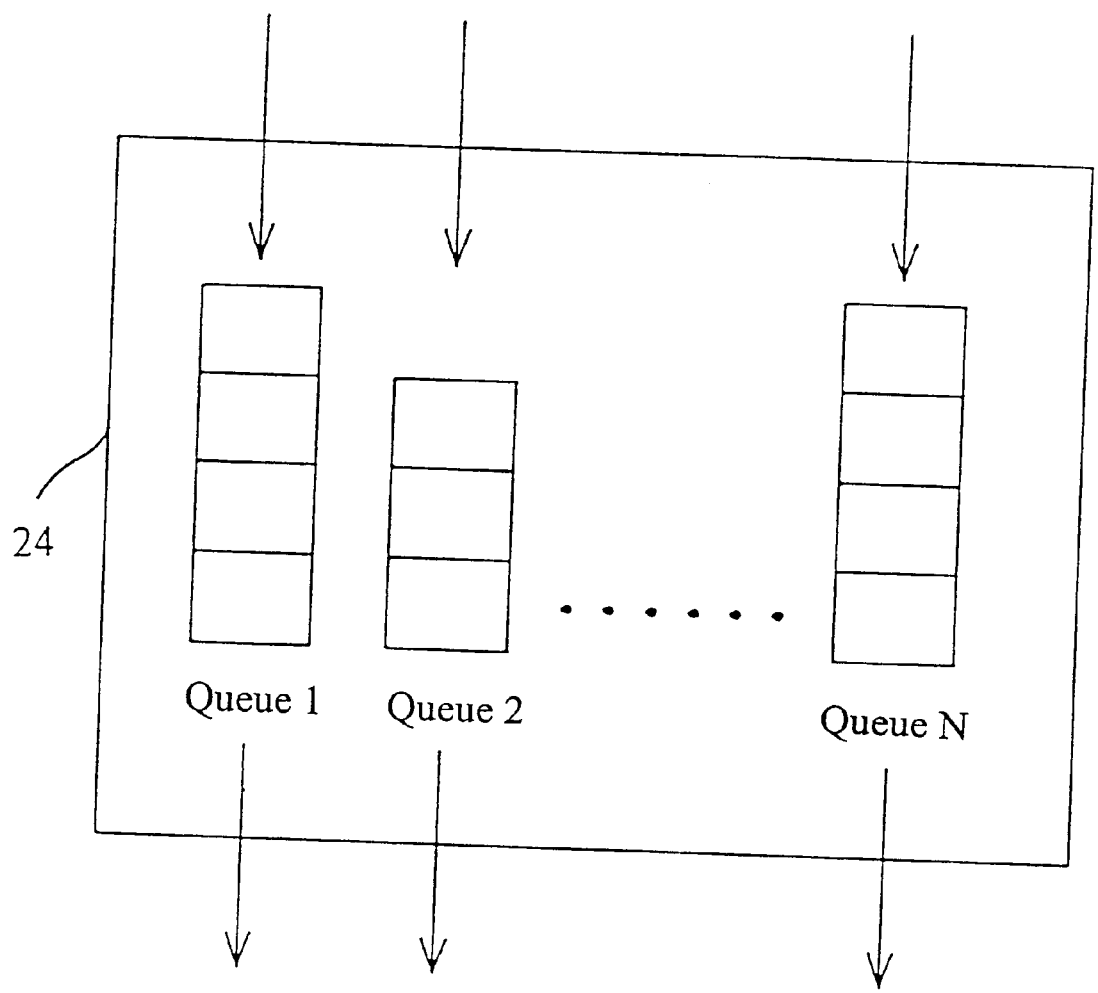
FIG. 2 depicts the logical output queues in the shared buffer of a multi-input/multi-output packet communication module.

The quasi-longest queue pointer 22 is updated whenever a packet is buffered into or retrieved from the shared buffer memory 20. FIG. 2 shows the logic diagram of the output queues in the shared buffer memory 20. However, the realization may differ from this diagram. There are N output queues (from Q1 to QN) in the shared buffer memory 20. Each output queue, if not empty, consists of one or more packets organized as a First-In-First-Out (FIFO) data structure. After a packet entering its destination queue, which may be any one of the output queues in 24, the length of that queue is increased. By comparing the varied length of the destination queue and the quasi-longest queue, the quasi-longest-queue pointer 22 is updated to point to the longer one. Similarly, after a packet which is transmitted from one of the output queues in 24, a comparison is performed to update the quasi-longest-queue pointer 22 to point to the longer one of the quasi-longest queue and the served queue. Whenever there is a queue length change, the quasi-longest-queue pointer 22 is updated to point to the longer one. When the shared buffer memory becomes full, newly arrived packets will push out older packets from the head of the quasi-longest queue. As the queue pointed by the quasi-longest-queue pointer 22 tracks the real longest queue closely, the packet loss performance of the present invention shall be quite close to the original Pushout discarding control.

Above procedure can be illustrated by following steps:

```
for i=1 to N{
    if (input port i active){
        j=dest [i];
        if (buffer full)
            QL[Max]=QL[Max]-1;      /*pushout*/
            QL[j]=QL[j]+1           /*buffering input cell*/
            if (QL[Max]<QL[j])
                Max=j;              /*input comparison*/
    }
    QL[i]=QL[i]-1;                  /*delivering output cell*/
    if (QL[Max]<QL[i])
        Max=i;                      /*output comparison*/
}
``` in which, dest(i) represents the destination port of the incoming packet at port i; QL[j] represents queue length of output queue j and Max is the quasi-longest queue pointer.

This invention employs the quasi-longest-queue pointer to track the real longest queue closely. In the above preferred embodiment, a corresponding input or output comparison is performed to update the quasi-longest-queue pointer on every packet arrival or departure. By comparing to the original Pushout packet discarding control, which sorts out the real longest one among all output queues, the number of comparisons as well as the complexity of the system for quasi-pushout is significantly reduced.

To further reduce the number of comparisons, one of the input and output comparisons can be omitted to become either the input-only quasi-pushout or the output-only quasi-pushout. The former compares only the destination queues and the quasi-longest queue, while the latter compares only the output queues and the quasi-longest queue. Apparently, fewer comparisons shall result in a longer duration of sub-optimal situation in which the quasi-longest-queue pointer points to a queue other than the real longest one.

For the output-only quasi-pushout, all queues are served periodically, so that the sub-optimal duration is upper-bounded. As for the input-only quasi-pushout, hot-spot ports are easily tracked due to their frequent packet arrivals. In general, all the quasi-pushout methods have almost the same packet loss performance as the original Pushout.

The present invention tracks the quasi-longest queue instead of the real longest one for selective pushout packet discarding control, thereby greatly reducing the number of queue length comparisons and achieving packet loss performance compatible to the original Pushout. The features of the invention is illustrated in the embodiment. The purpose is to facilitate those skilled in the art to practice the invention after understanding the contents, but not limited to the disclosed scope the present invention. therefore, any revision or replacement or equivalent modifications based on the technical concept or spirit disclosed by the present invention are within the scope of the claims as disclosed below.

What is claimed is:

1. A packet discarding method by input-only quasi-pushout, utilized for selective pushout in the shared-buffer packet communication system, comprising:

once a packet enters the system, if the shared memory has been used up, the packet at the head of the quasi-longest queue is pushed out, the release space is taken up by the entering packet to its destination queue;

the length of the quasi-longest and destination queues are decreased and increased respectively, if the length of the destination queue becomes longer than the quasi-longest queue, then the quasi-longest-queue pointer shall be updated to point to the destination queue; and once a packet leaves the system from one of the output queues, the length of the output queue is decreased.

2. A packet discarding method by output-only quasi-pushout, utilized for selective pushout in the shared-buffer packet communication system, comprising:

once a packet enters the system, if the shared memory has been used up, the packet at the head of the quasi-longest queue is pushed out, the released space is taken up by the entering packet to its destination queue;

the length of the quasi-longest and destination queues are decreased and increased respectively; and once a packet leaves the system from one of the output queues, the length of this output queue is decreased, if the length of this output queue is still longer than that of the quasi-longest queue, then the quasi-longest-queue pointer shall be updated to point to this output queue.

3. A packet discarding method by quasi-pushout, utilized for selective pushout in the shared-buffer packet communication system, comprising:

once a packet enters the system, if the shared memory has been used up, the packet at the head of the quasi-longest queue is pushed out, the released space is taken up by the entering packet to its destination queue;

the length of the quasi-longest and destination queues are decreased and increased respectively, if the length of the destination queue becomes longer than that of the quasi-longest queue, then the quasi-longest-queue pointer shall be updated to point to the destination queue; and once a packet leaves the system from one of the output queues, the length of this output queue is decreased, if the length of this output queue is still longer than that of the quasi-longest queue, then the quasi-longest-queue pointer shall be updated to point to this output queue.

4. A packet communication system with shared buffer memory and selective pushout packet discarding control, comprising:

a packet communication module, including
one or more in put ports for receiving packets;
one or more output ports for transmitting packets;
a shared buffer memory having at least two logic queues for organizing buffered packets; and
a processor having a quasi-longest queue pointer pointing to one of the logic queues in the shared buffer memory as the quasi-longest queue, on which the selective pushout discarding is performed; and said processor up dating the quasi-longest queue pointer on every queue length changing event, wherein the updating of the quasi-longest queue pointer is provided by comparing the varied length of a changed logic queue to the length of a then quasi-longest queue.

5. The system as claimed in claim 4, wherein the length change takes place in the destination queue of a input packet.

6. The system as claimed in claim 4, wherein the length change takes place in one of the output queues.

* * * * *